United States Patent
Hudman et al.

(10) Patent No.: US 10,178,374 B2
(45) Date of Patent: Jan. 8, 2019

(54) DEPTH IMAGING OF A SURROUNDING ENVIRONMENT

(71) Applicant: Microsoft Technology Licensing, LLC, Redmond, WA (US)

(72) Inventors: Joshua Mark Hudman, Issaquah, WA (US); Marshall T. DePue, Redmond, WA (US); Andrew K. Juenger, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 354 days.

(21) Appl. No.: 14/678,842

(22) Filed: Apr. 3, 2015

(65) Prior Publication Data

US 2016/0295197 A1  Oct. 6, 2016

(51) Int. Cl.
*H04N 13/271* (2018.01)
*H04N 13/25* (2018.01)
(Continued)

(52) U.S. Cl.
CPC ........... *H04N 13/271* (2018.05); *G02B 13/06* (2013.01); *G06F 3/16* (2013.01); *G06K 9/00288* (2013.01);
(Continued)

(58) Field of Classification Search
CPC ............. H04N 13/0271; H04N 5/2226; H04N 5/2254; H04N 5/2258; H04N 5/23222;
(Continued)

(56) References Cited

U.S. PATENT DOCUMENTS

| | | | |
|---|---|---|---|
| 6,304,285 B1 * | 10/2001 | Geng | H04N 5/2259 348/36 |
| 6,449,103 B1 * | 9/2002 | Charles | G02B 13/06 359/366 |

(Continued)

FOREIGN PATENT DOCUMENTS

| | | |
|---|---|---|
| CN | 103200352 A | 7/2013 |
| CN | 103248806 A | 8/2013 |

(Continued)

OTHER PUBLICATIONS

Xiong, Z.-H. et al., "Depth space partitioning for omni-stereo object tracking", IET Computer Vision, vol. 6, Issue 2, Mar. 16, 2012, 11 pages.

(Continued)

*Primary Examiner* — Marnie A Matt
(74) *Attorney, Agent, or Firm* — Alleman Hall Creasman & Tuttle LLP

(57) ABSTRACT

Examples are disclosed herein that are related to depth imaging of a 360-degree field of view. One example provides a depth imaging system comprising an image sensor, a reflector subsystem comprising one or more reflectors arranged to reflect a radial field of view of a surrounding environment toward the image sensor, a projector configured to project light onto the reflector subsystem for reflection into the surrounding environment, and a computing device comprising a logic subsystem and a storage subsystem comprising instructions executable by the logic subsystem to receive image data from the image sensor, and output a depth image based upon the image data.

20 Claims, 11 Drawing Sheets

(51) Int. Cl.
| | |
|---|---|
| *H04N 13/254* | (2018.01) |
| *H04N 7/14* | (2006.01) |
| *H04N 5/222* | (2006.01) |
| *H04N 7/18* | (2006.01) |
| *H04N 5/225* | (2006.01) |
| *G02B 13/06* | (2006.01) |
| *H04N 5/232* | (2006.01) |
| *G06K 9/00* | (2006.01) |
| *G06F 3/16* | (2006.01) |

(52) U.S. Cl.
CPC ....... *G06K 9/00335* (2013.01); *H04N 5/2226* (2013.01); *H04N 5/2254* (2013.01); *H04N 5/2256* (2013.01); *H04N 5/2258* (2013.01); *H04N 5/23222* (2013.01); *H04N 5/23238* (2013.01); *H04N 7/142* (2013.01); *H04N 7/147* (2013.01); *H04N 7/18* (2013.01); *H04N 13/25* (2018.05); *H04N 13/254* (2018.05)

(58) Field of Classification Search
CPC ............. H04N 5/23238; H04N 13/025; H04N 13/0253; G02B 13/06; G01B 11/22; G06F 3/16; G06K 9/00288; G06K 9/00335; G08B 13/19628
See application file for complete search history.

(56) References Cited

U.S. PATENT DOCUMENTS

| | | | | |
|---|---|---|---|---|
| 7,176,960 | B1* | 2/2007 | Nayar | G06T 3/4038 348/207.99 |
| 8,323,106 | B2 | 12/2012 | Zalewski | |
| 8,866,889 | B2 | 10/2014 | Masalkar et al. | |
| 2003/0160862 | A1* | 8/2003 | Charlier | H04N 5/23238 348/14.08 |
| 2006/0268103 | A1* | 11/2006 | Kweon | G03B 35/08 348/36 |
| 2008/0247061 | A1* | 10/2008 | Simkulet | G02B 13/06 359/730 |
| 2011/0211044 | A1* | 9/2011 | Shpunt | G06F 3/005 348/46 |
| 2012/0051588 | A1* | 3/2012 | McEldowney | G03B 17/54 382/103 |
| 2012/0056982 | A1* | 3/2012 | Katz | G06F 3/017 348/43 |
| 2012/0105585 | A1* | 5/2012 | Masalkar | G06F 3/017 348/46 |
| 2013/0002823 | A1 | 1/2013 | Lim et al. | |
| 2013/0278631 | A1 | 10/2013 | Border et al. | |
| 2014/0009503 | A1* | 1/2014 | Gorstan | G06T 3/20 345/680 |
| 2014/0049609 | A1* | 2/2014 | Wilson | G01S 17/89 348/46 |
| 2016/0117561 | A1* | 4/2016 | Miyazawa | G06K 9/00805 348/169 |
| 2017/0026570 | A1* | 1/2017 | Shepard | H04N 5/2254 |
| 2017/0322400 | A1* | 11/2017 | Englert | G02B 17/0808 |

FOREIGN PATENT DOCUMENTS

| | | | | |
|---|---|---|---|---|
| FR | 2902592 A1 * | 12/2007 | ............ | G02B 13/06 |
| WO | WO-0168540 A2 * | 9/2001 | ............ | G02B 13/06 |
| WO | 2014169952 A1 | 10/2014 | | |

OTHER PUBLICATIONS

ISA European Patent Office, International Search Report and Written Opinion Issued in PCT Application No. PCT/US2016/023378, dated Sep. 15, 2016, WIPO, 18 pages.

IPEA European Patent Office, Second Written Opinion Issued in PCT Application No. PCT/US2016/023378, dated Feb. 21, 2017, WIPO, 9 Pages.

* cited by examiner

DEPTH IMAGING OF A SURROUNDING ENVIRONMENT

BACKGROUND

Imaging systems configured to capture a wide field of view of a scene may be useful in many applications, including but not limited to audiovisual communications in conference room settings. For example, images from multiple cameras may be stitched together to form a combined image capturing multiple meeting participants seated around a conference table. The combined image then may be sent to another party participating in the meeting remotely so that the other party may view the meeting participants during the meeting.

SUMMARY

Examples are disclosed herein that are related to depth imaging of a 360-degree field of view. One example provides a depth imaging system comprising an image sensor, a reflector subsystem comprising one or more reflectors arranged to reflect a radial field of view of a surrounding environment toward the image sensor, a projector configured to project light onto the reflector subsystem for reflection into the surrounding environment, and a computing device comprising a logic subsystem and a storage subsystem comprising instructions executable by the logic subsystem to receive image data from the image sensor, and output a depth image based upon the image data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, an image of a 360-degree field of view of a scene may be formed by capturing multiple images of different fields of view via multiple cameras and stitching the images together into one continuous panoramic image. However, image stitching may produce artifacts in the final image. Further, the use of multiple cameras may increase the expense of an imaging device relative to the use of a single image sensor. Wide-angle lenses (e.g. a fisheye lens) also may be utilized to capture wide panoramic or hemispherical images. However, such lenses may distort an image significantly.

Accordingly, examples are disclosed herein that relate to the capture of images having a 360 degree radial field of view via the use of a single image sensor. Further, examples also disclosed that utilize one or more of the optical components of a 360 degree image acquisition system to direct projected light into the 360 degree field radial field of view, and thus to enable depth imaging.

Figure 1:
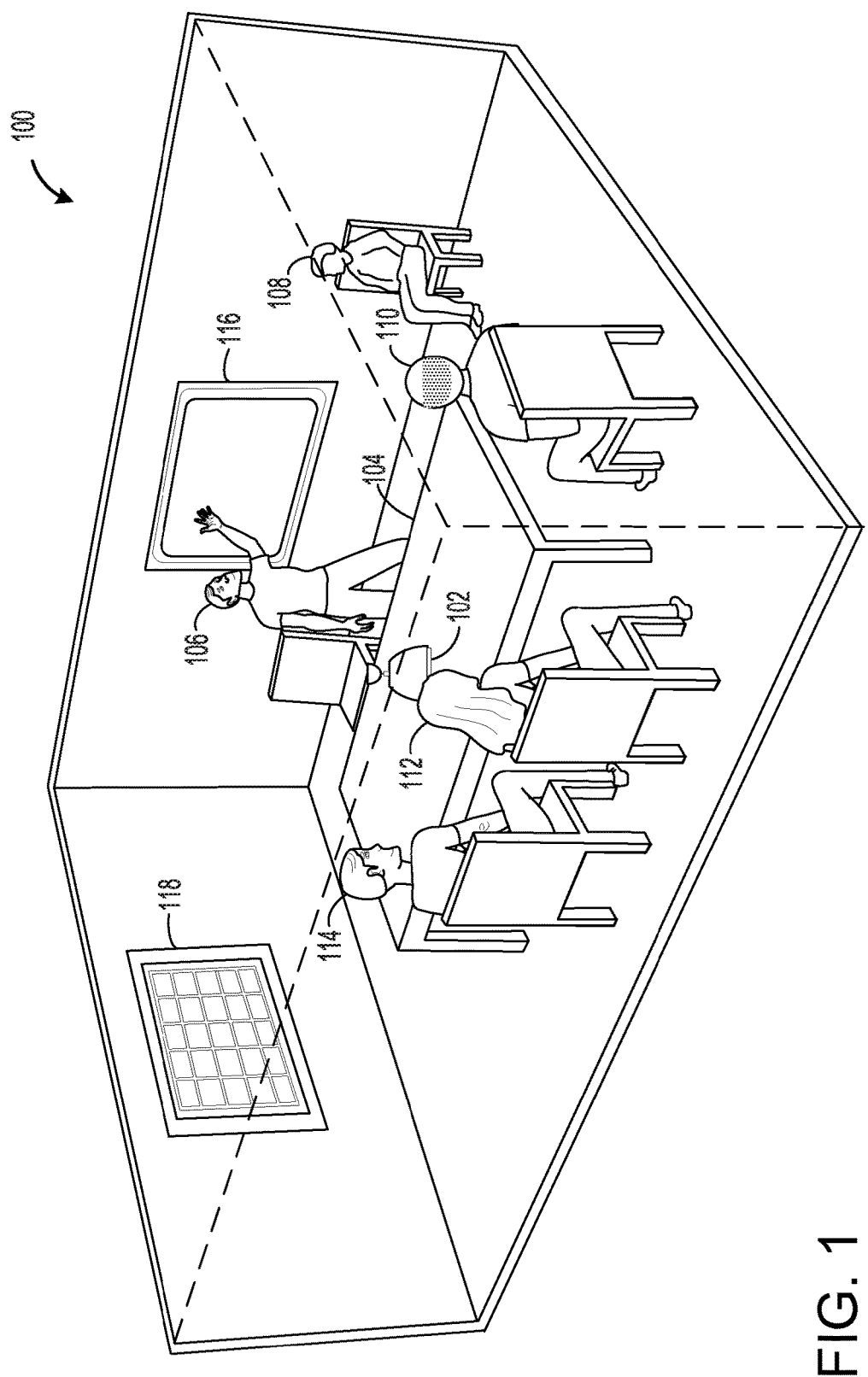
FIG. 1 shows an example use scenario for a 360-degree audiovisual depth imaging system.

FIG. 1 shows an example use scenario in which 360-degree depth imaging is used in a conference room 100. More particularly, FIG. 1 illustrates a 360-degree audiovisual communications system 102 placed in the center of the conference room 100 on a table 104, surrounded by multiple participants in a conference meeting, namely persons 106, 108, 110, 112, and 114. The conference room 100 also includes objects, a display 116 and a window 118.

Figure 2:
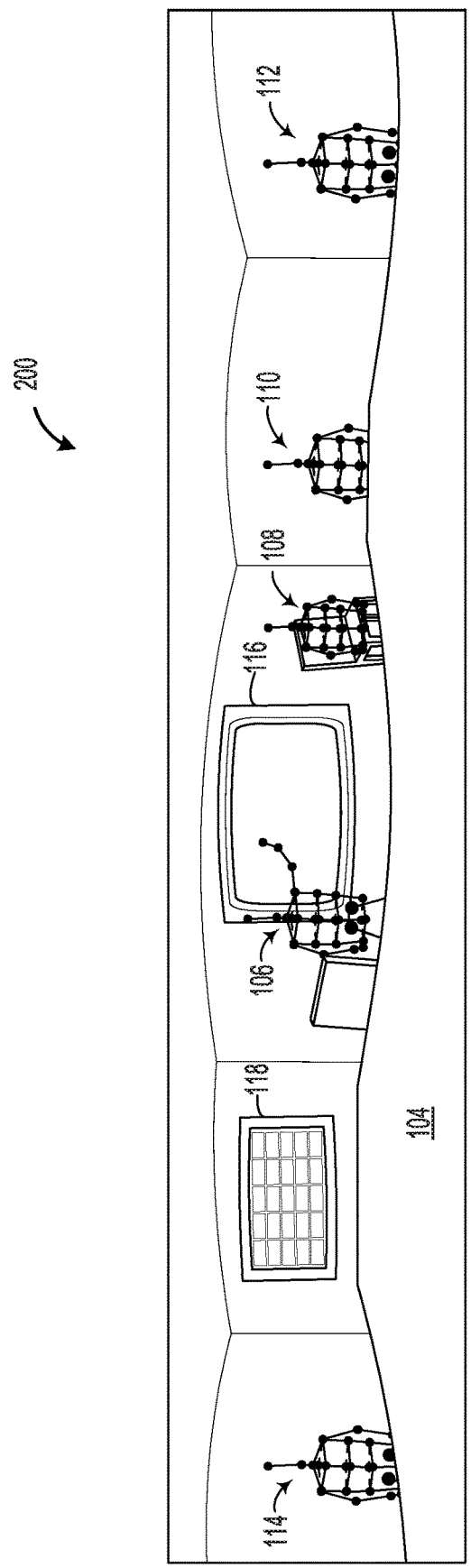
FIG. 2 shows example 360-degree depth data obtained via processing depth image data captured by the system of FIG. 1.

FIG. 2 shows an example of data 200 produced from a depth image captured by the 360-degree audiovisual communications system 102 after the image data has been corrected for distortion. Depth imaging may be used to identify human figures in the environment, and further to fit skeletal models to the human figures 106, 108, 110, 112 and 114. Analysis of the changes in the skeletal models over time may allow gestures of the human figures to be identified, thus enabling gesture-based control of the audiovisual communications system 102 and/or other computing devices (not shown) in communication with the audiovisual communications system 102. Skeletal tracking also may be used to enable functions such as digitally zooming a two-dimensional image sensor toward a person that is gesturing or moving about the environment, etc. The depth image data also may be used to form a depth map of the environment as a whole (as illustrated by the table 104, the display 116 and the window 118), thereby allowing object tracking and other functionalities to be implemented.

The audiovisual communication system 102 also may be used to acquire two dimensional image data of the surrounding environment, as mentioned above. Two dimensional image data may be streamed to remote meeting participants for viewing the meeting, may be recorded to document the meeting, and/or may be processed to perform functions such as facial recognition, object recognition, etc., alone or in combination with depth image data. The image representation as depicted in FIG. 2 is illustrated for simplicity, and it will be understood that any additional data, including but not limited to images of the persons attending the meeting and/or metadata such as virtual labels for identified persons, may be displayed or otherwise included in the image data.

The illustrated scenario of FIG. 1 and FIG. 2 is provided as an example and is not intended to be limiting in any way, as a 360-degree audiovisual communications system according to the present disclosure may be used in a variety of different applications. In addition to a video conferencing system, as illustrated in FIGS. 1 and 2, other examples may include a gaming system (e.g. as a depth camera set on a coffee table in the center of a gaming environment, rather than as a set-top imaging device), a surveillance system (e.g. an overhead surveillance camera system), and an environmental mapping system (e.g. mounted to a vehicle traversing an environment).

Figure 3:
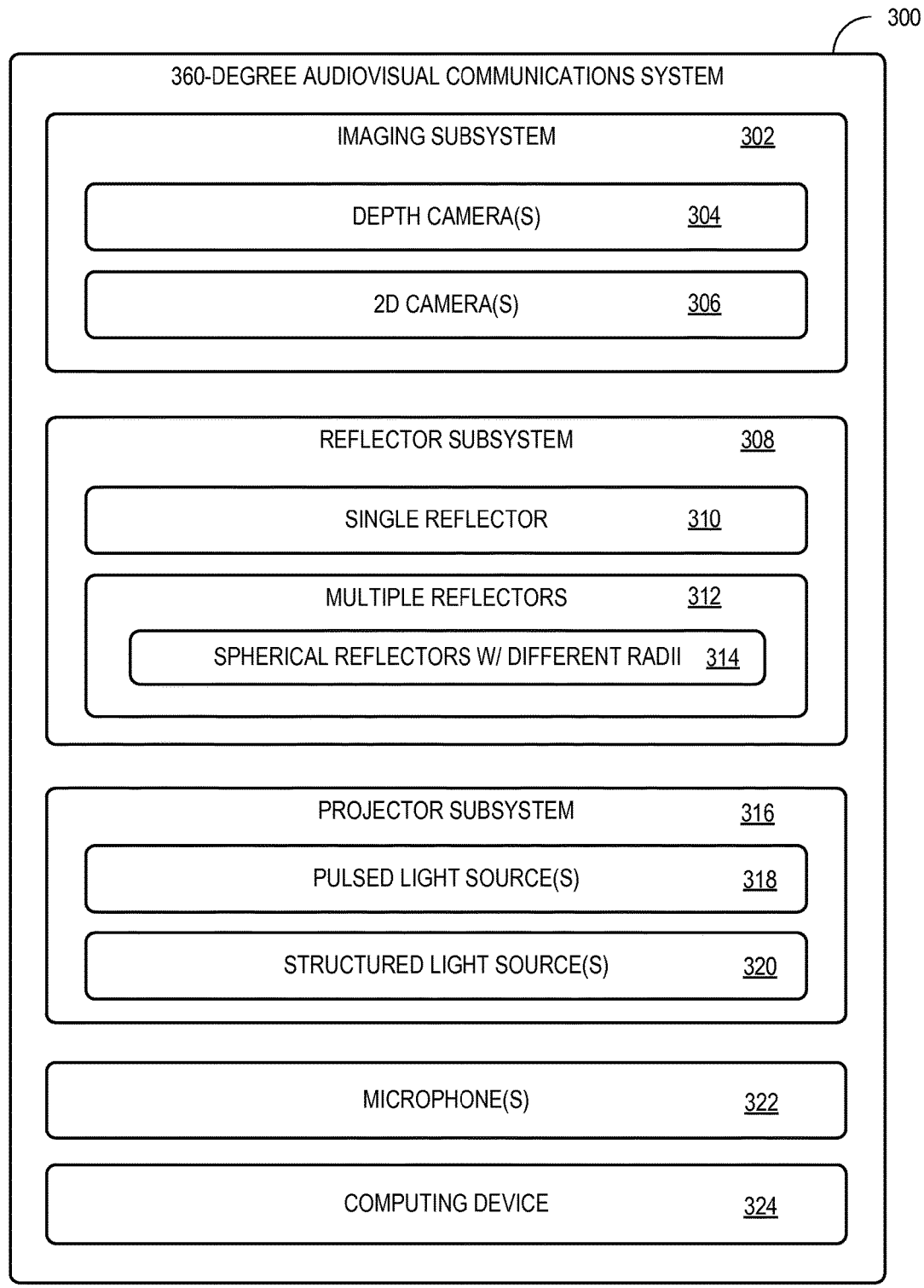
FIG. 3 shows a block diagram of an example 360-degree audiovisual communications system.

FIG. 3 shows a block diagram of an example 360-degree audiovisual communications system 300. The 360-degree audiovisual communications system 300 comprises an imaging subsystem 302, which may include one or more depth camera(s) 304, one or more 2D (two-dimensional) image sensor(s) 306, such as RGB (red-green-blue) cameras and/or infrared cameras, and/or any other suitable image sensors. The 360-degree audiovisual communications system 300 further comprises a reflector subsystem 308, which may include a single reflector arrangement 310 or a multiple reflector arrangement 312. A multiple reflector implementation may take a variety of forms. For example, a multiple reflector implementation may include a plurality of small flat reflectors placed around a curved substrate. As another example, a multiple reflector implementation may include spherical reflectors having different radii 314. Further, as described in more detail below, some multiple reflector arrangements may be utilized to acquire stereo images of the environment using a common image sensor to image multiple perspectives.

The 360-degree audiovisual communications system 300 further comprises a projector subsystem 316 configured to project light onto the reflector subsystem 308 for reflection into the surrounding environment. The projected light as reflected from objects in the environment may then be received at the imaging subsystem 302 via the reflector subsystem 308 to form a depth image. Where the depth imaging utilizes time-of-flight (TOF) techniques, the projector subsystem 316 may utilize one or more pulsed light source(s) 318 configured to emit pulses of light (e.g. infrared light), and the time between emission and receipt of the light pulses may be measured to determine depths of objects in the environment. Where the depth imaging utilizes structured light, the projector subsystem 316 may utilize one or more structured light source(s) 320 configured to project patterned light into the surrounding environment. Alternatively, a phase-based TOF technique that measures a phase shift between emitted modulated light from the projector subsystem 316 and the reflected light could be used for depth imaging. As described in more detail below, various arrangements of projectors and reflectors may be utilized to obtain stereo images. It will be understood that these methods of depth imaging are described for the purpose of example, and are not intended to be limiting in any manner.

The 360-degree audiovisual communications system 300 further comprises one or more microphone(s) 322 which may receive audio data including speech inputs from people speaking in the surrounding environment. The system 300 may be configured to isolate a person speaking by, for example, performing beamforming in a direction of a person speaking as determined from depth image data.

Figure 17:
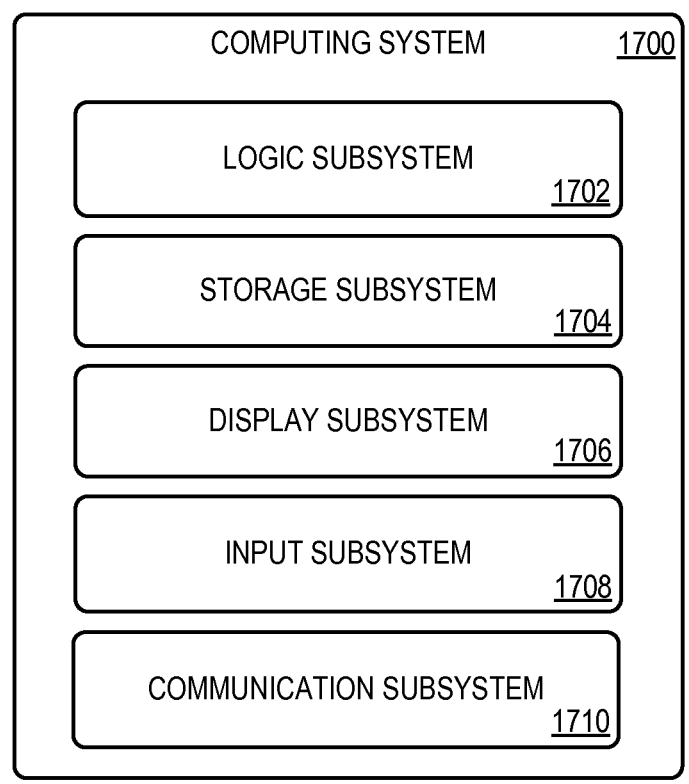
FIG. 17 shows a block diagram of an example computing system.

The 360-degree audiovisual communications system 300 further comprises a computing device 324, shown in simplified form in FIG. 3, discussed in more detail below with regard to FIG. 17. The methods as described herein may be tied to the any suitable computing system(s), such as the computing device 324. Alternatively, the computing device 324 may be located remotely from the system 300.

Figure 4:
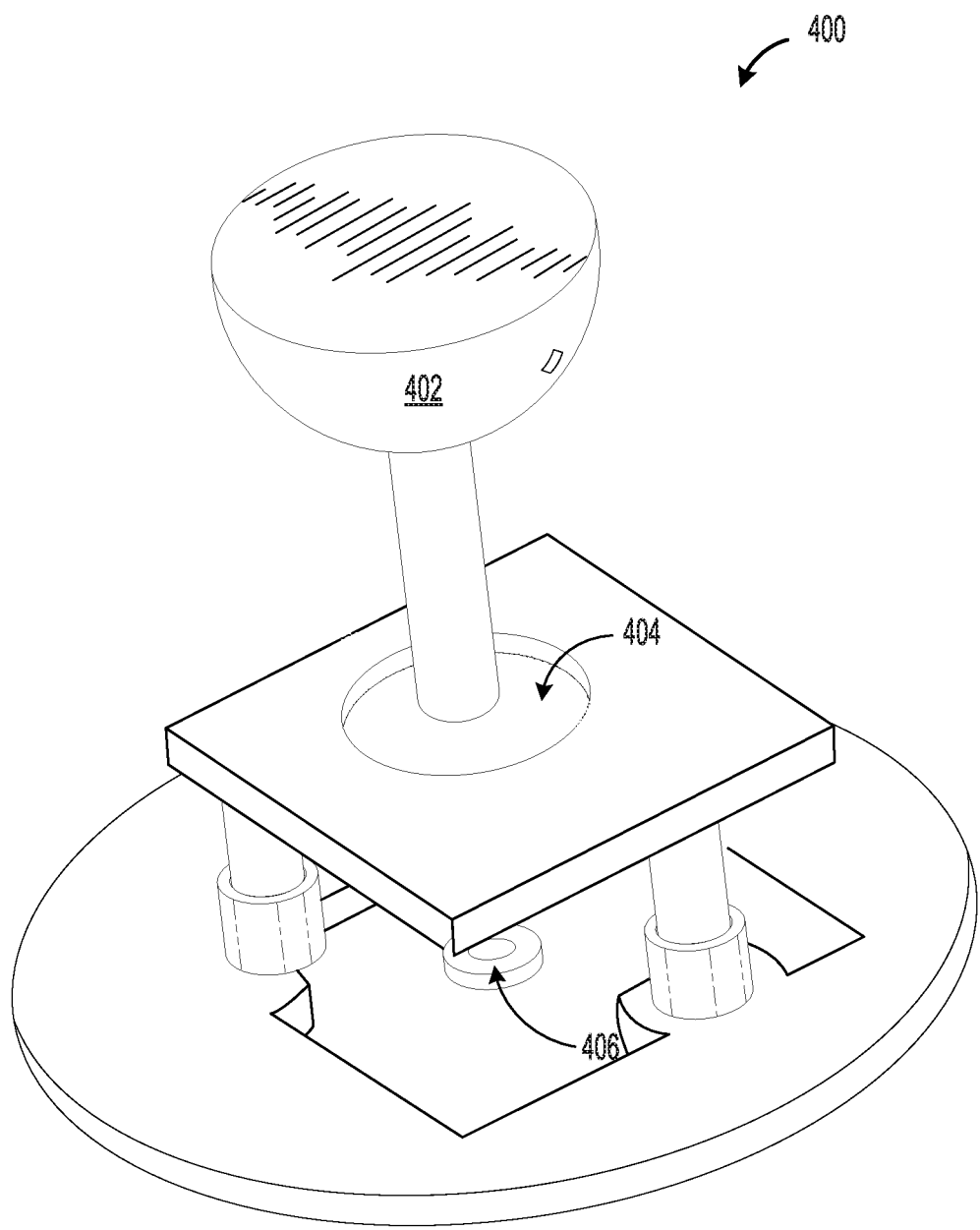
FIG. 4 shows a view of an example 360-degree audiovisual depth imaging system.

FIG. 4 shows an example 360-degree audiovisual communications system 400 as disclosed herein. In this figure, an outer portion of the system is removed to illustrate interior components. The system 400 comprises a reflector 402 attached to the system 400, wherein the reflector 402 is configured to reflect a 360-degree radial field of view of the surrounding environment through an optical window 404 toward an imaging subsystem 406. It is noted that the shape of the reflector may be selected to image a full 360 degrees in an azimuthal angular range, while imaging a lesser range in a polar angular range. This may help to avoid imaging areas in which people are less likely to be located, such as above the reflector 402, and thus may utilize more of the image sensor area to image areas where people are more likely to be located, such as around a table on which system 400 is placed.

Figure 5:
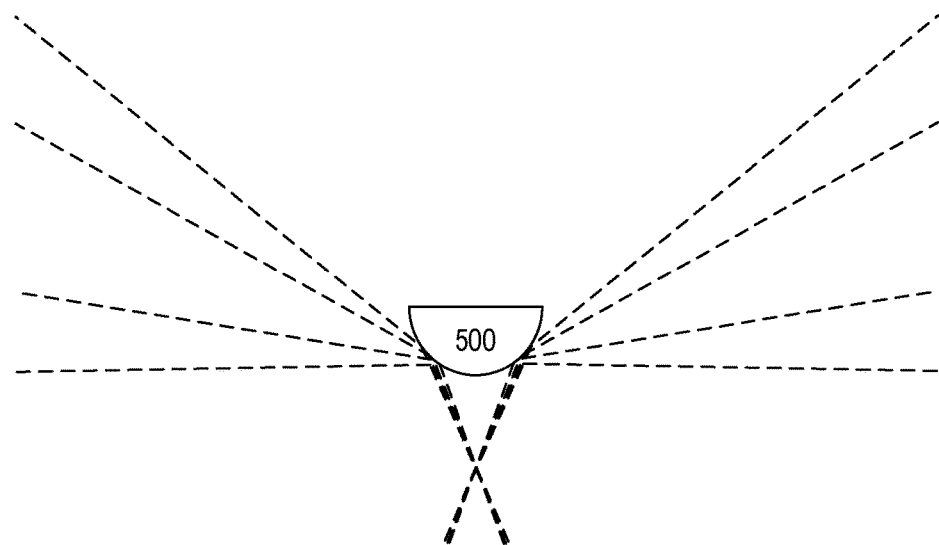
FIG. 5 shows an example reflector arrangement for 360-degree depth imaging.

FIG. 5 shows an example single reflector arrangement for 360-degree imaging. In FIG. 5, a reflector 500 is depicted as a hemispherical reflector, and example light rays are shown as dotted lines. An image sensor (not shown in FIG. 5) may be placed facing a center of the reflective area of the reflector 500 (e.g. the bottom of the reflector 500 in the orientation of FIG. 5) and may be focused at a focal plane bisecting or otherwise located close to the reflector 500. In this manner, the image sensor may acquire an image of the reflective surface, thereby capturing the image of the environment surrounding the reflector. The configuration of the reflector 500 may be chosen based upon the desired field of view to be imaged. As a non-limiting example, a single reflector arrangement may be configured to acquire a 180 degree polar field of view by 360 degree azimuthal field of view of the surrounding scene.

Figure 6:
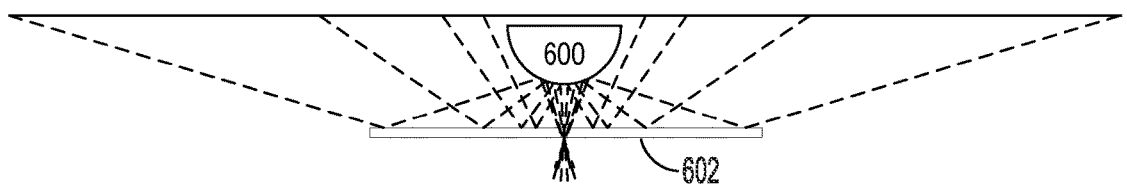
FIG. 6 shows another example reflector arrangement for 360-degree depth imaging.

FIG. 6 provides another example reflector arrangement utilizing a hemispherical reflector 600. However, unlike FIG. 5, the configuration of FIG. 6 also utilizes a flat reflector 602 to reflect light from the environment toward the hemispherical reflector 600. The flat reflector 602 may have any suitable shape. As one non-limiting example, the flat reflector 602 may have a ring shape, with an opening in the middle to permit light to reach the image sensor. The arrangement of FIG. 6 may offer lower distortion than that of the arrangement of FIG. 5, and may include the use of beam blocks to help prevent undesired light from reaching the hemispherical reflector 600 for reflection toward the camera.

Figure 7:
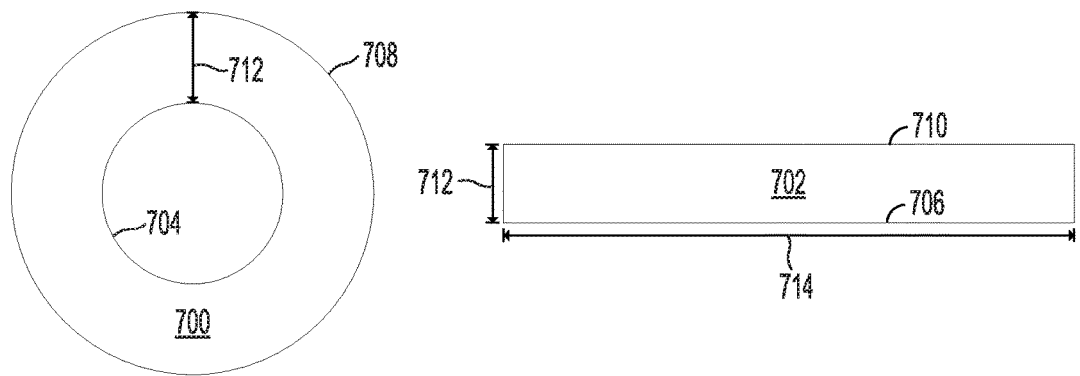
FIG. 7 depicts schematic representations of 360-degree image data received from the example reflector arrangement(s) of FIG. 5 and/or FIG. 6 before and after applying distortion correction.

The reflectors of FIGS. 5 and 6 result in the formation of a ring-shaped image on an image sensor. FIG. 7 shows a schematic depiction of such a ring-shaped image 700. The ring-shaped image 700 may be processed to reduce distortion, and thereby form a rectangular band-shaped image 702 for viewing and/or additional processing (e.g. facial recognition, skeletal fitting etc.). Any suitable distortion correction method may be used. As one non-limiting example, each pixel from the inner border 704 of the ring-shaped image 700 may be mapped to each pixel of the bottom border 706 of the rectangular image 702. As such, the length in pixels of the image 702, shown as 714, may be equivalent to the number of pixels surrounding the inner border 704 of the ring-shaped image 700. As the outer border 708 of the ring-shaped image 700 has a greater number of pixels than the inner border 704, some pixels on the outer border 708 may be omitted such that only certain pixels are mapped to the top border 710 of the rectangular image 702 (e.g. every other pixel). Pixels between the top and bottom borders may be omitted proportionally to their relative positions between the inner and outer borders of the ring-shaped image.

Other distortion correction methods may utilize all pixels in the image 700 to map to the rectangular image 702. For example, pixels may be averaged over each of a plurality of predefined areas in the image 700. Such resizing may result in a corrected image that has a relatively higher signal-to-noise ratio compared to an image resulting from skipping pixels. In this example, the resulting pixel length 714 of the rectangular image 702 may correspond to a number of pixels that is greater than the pixel length of 704 but less than that of 708. For instance, in a non-limiting example of ring-shaped image 700 where the radial length 712 contains 1,080 pixels, the inner border 704 contains 6,785 pixels, and the outer border 708 contains 13,570 pixels, the resulting dimensions of the rectangular image 702 may be 1,080 pixels by 7,860 pixels.

Figure 8:
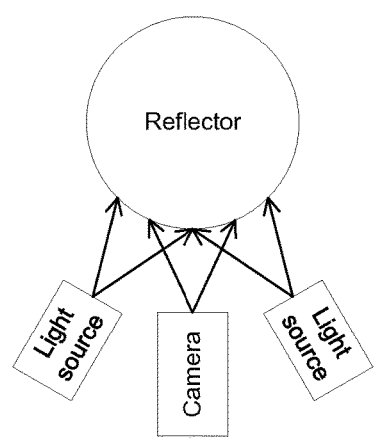
FIGS. 8-10 show block diagrams depicting examples of single reflector arrangements for 360-degree depth imaging.
Figure 9:
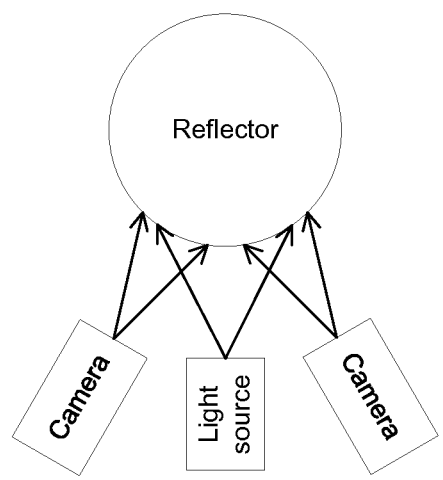
Figure 10:
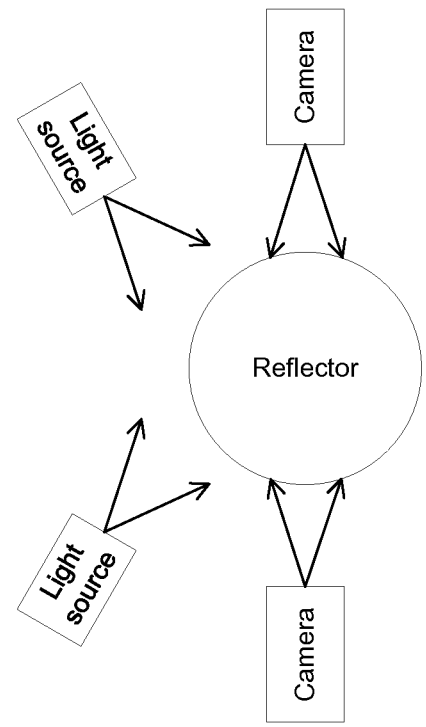

FIGS. 8-10 show additional examples of single reflector configurations, and also illustrates example arrangements of cameras and projectors that may be utilized for depth imaging. First, FIG. 8 shows an example multi-projector, single camera arrangement. In this example, the camera may be configured to operate as a structured light depth sensor or time of flight depth sensor, as well as a two-dimensional camera instead of or in addition to a depth camera.

FIG. 9 shows another example arrangement utilizing multiple cameras and a single light source. In this example, the cameras may be arranged to perform stereoscopic imaging, wherein each camera captures a different perspective of an overlapping portion of the 360-degree field of view.

FIG. 10 shows an example of a multi-camera, multi-projector arrangement which may provide for greater separation of the captured perspectives. In each of these examples, the projected light sources may comprise infrared light sources, and/or light of any other suitable wavelength.

Figure 11:
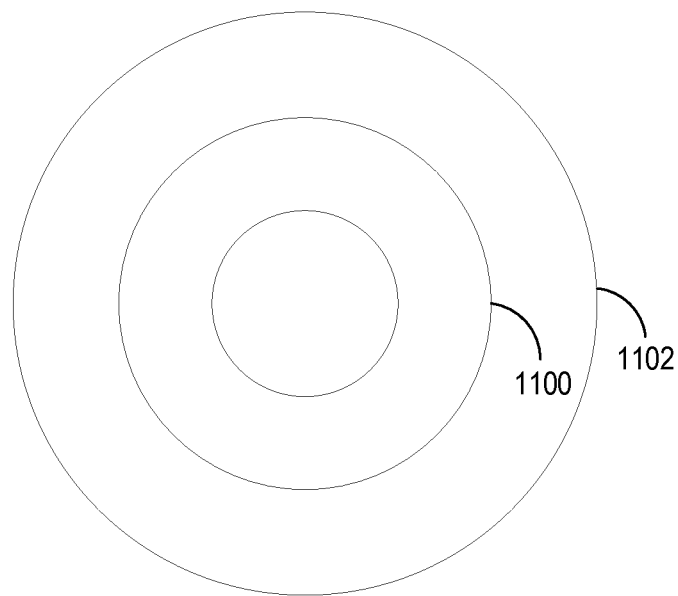
FIG. 11 depicts a schematic representation of 360-degree image data received from a multi-reflector arrangement.

A stereo imaging arrangement also may be achieved by utilizing a single image sensor combined with two or more 360 degree reflectors or reflector arrangements having different radii but a same central axis. FIG. 11 shows a schematic representation of a shape of image data on an image sensor that may result from such an arrangement of two hemispherical reflectors. Rather than the single, ring-shaped image of FIG. 7, FIG. 11 shows an outer ring image 1100 and an inner ring image 1102, each ring image resulting from imaging a corresponding spherical reflector. The images may be extracted and corrected for distortion to produce images having different perspectives of a scene.

Figure 12:
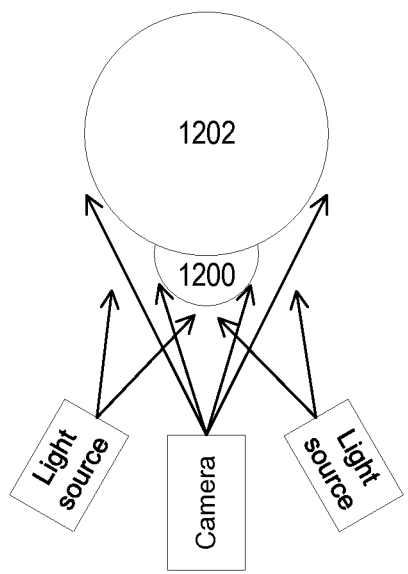
FIGS. 12 and 13 show block diagram examples of double reflector arrangements for 360-degree depth imaging.
Figure 13:
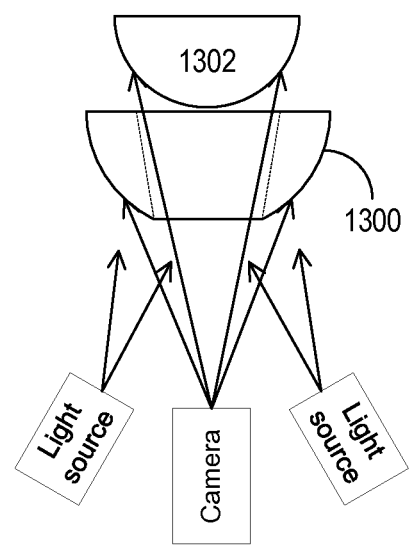

FIG. 12 and FIG. 13 each shows an example of a double reflector arrangement that may produce such an image data pattern. In FIG. 12, a first spherical reflector 1200 of a smaller relative radius is configured to produce the image data represented by the inner ring image 1100 of FIG. 11. In this configuration, the first spherical reflector 1200 is positioned relatively closer to the camera than a second spherical reflector 1202 having a larger relative radius. The second spherical reflector may be positioned to reflect the image data represented by the outer ring image 1102 of FIG. 11.

In contrast, FIG. 13 shows a double reflector arrangement in which a first reflector 1300 having a larger radius is positioned closer to the camera than a second reflector 1302 having a smaller radius. Here, the second spherical reflector 1302 of a smaller relative radius is configured to reflect the view represented by the inner ring image 1100 of FIG. 11. The first reflector 1300 includes an opening in the middle, as indicated by the dotted lines, to permit the second reflector 1302 to reflect an image of the environment through the opening of the first reflector 1300 toward the camera.

The double reflector configurations of FIGS. 12 and 13 may have other uses. In some examples, the first reflector 1300 may have an infrared rejection coating (e.g. a suitable dielectric coating), such that the camera does not receive projected infrared light reflected from 1300 but does receive projected infrared light reflected from the second reflector 1302. Thus, the camera may be able to receive RGB data with relatively higher resolution from the first reflector 1300, and depth data from the second reflector 1302. It will be understood that the arrangements of FIG. 12 and FIG. 13 are presented for the purpose of example, and that any other suitable reflector, camera, and light source arrangements may be utilized.

Figure 14:
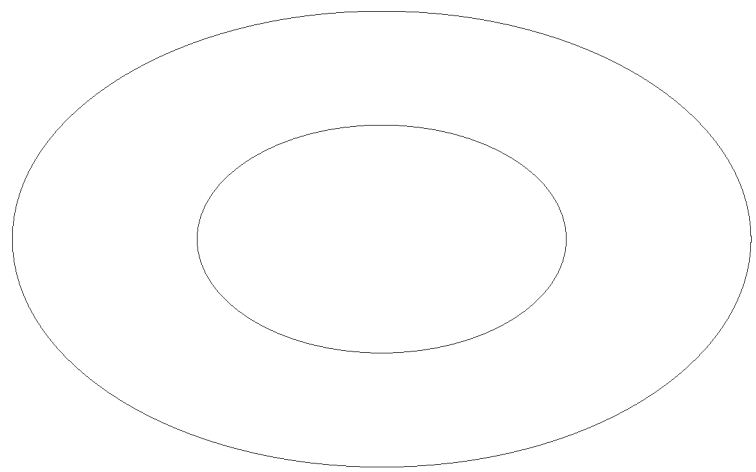
FIG. 14 depicts a representation of image data received from a non-spherical ellipsoidal reflector.
Figure 15:
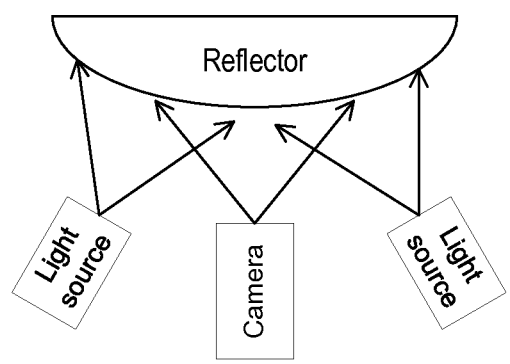
FIG. 15 shows a block diagram depicting an example of a non-spherical ellipsoidal reflector arrangement for 360-degree imaging.

Although the examples discussed thus far include the use of spherical reflectors, any suitably shaped reflectors may be used. FIG. 14 shows an example representation of image data acquired from a non-spherical ellipsoidal reflector, and FIG. 15 shows an example optical arrangement which may provide for the image data represented in FIG. 15. In such an example, the ratio of the maximum radius to the minimum radius of the reflector may help to utilize a larger portion of the area of a rectangular image sensor, and thereby may help to improve resolution.

Figure 16:
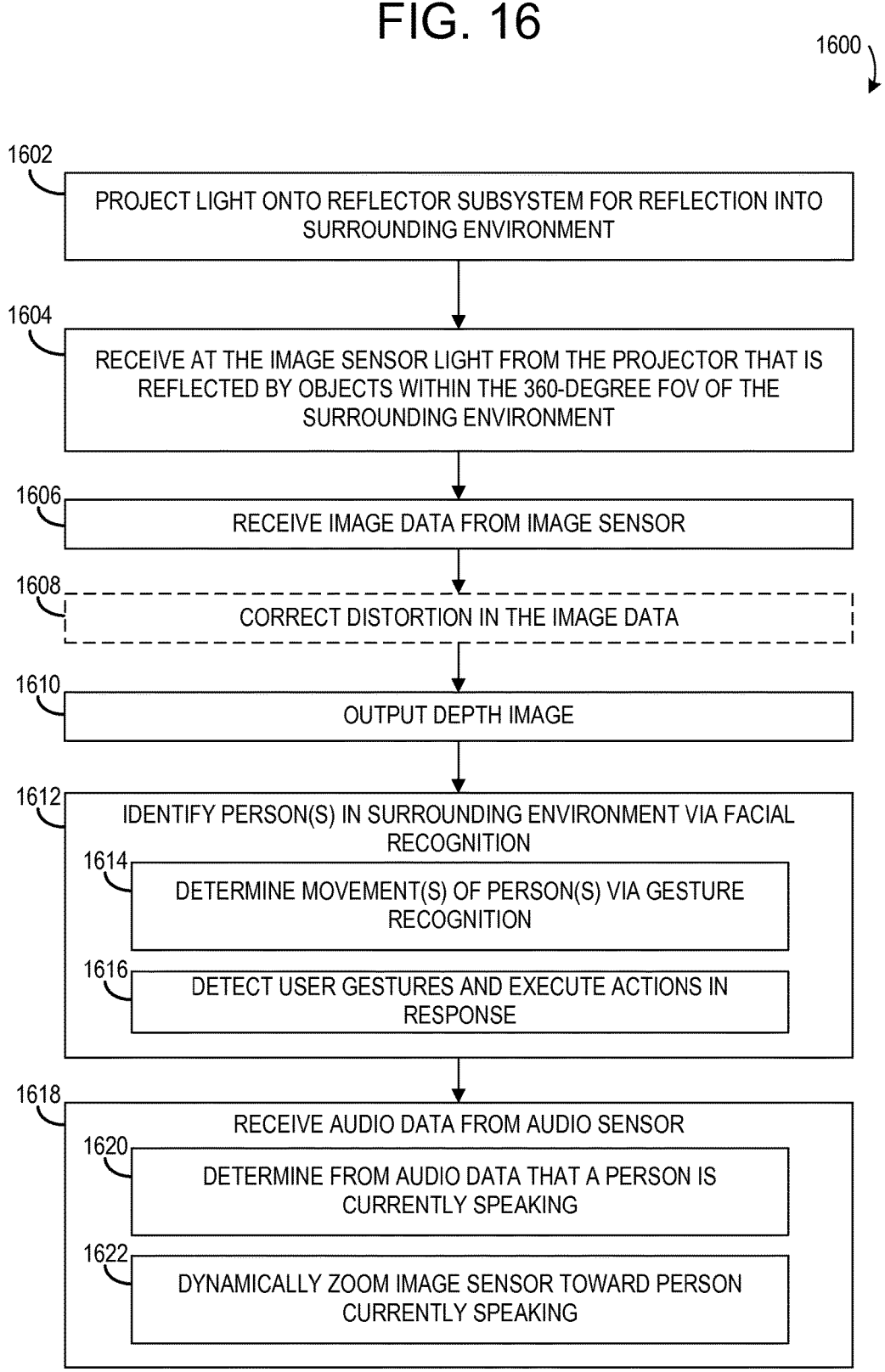
FIG. 16 is a flow diagram depicting an example method for performing 360-degree field of view depth imaging.

FIG. 16 shows an example method 1600 of imaging a 360-degree field of view of a surrounding environment as disclosed herein. Method 1600 comprises, at 1602, projecting light onto a reflector subsystem for reflection into the surrounding environment. This may comprise, for example, projecting infrared light and/or visible light, wherein the light may be pulsed, have structure suitable for structured light depth sensing, and/or may have any other suitable form. Method 1600 further comprises, at 1604, receiving at an image sensor, via the reflector subsystem, light from the projector that is reflected by objects within the 360-degree field of view of the surrounding environment. As discussed above, the received light may be analyzed in any suitable manner to acquire depth data, including but not limited to time-of-flight analysis and structured light analysis.

Method 1600 further comprises, at 1606, receiving image data from the image sensor, and optionally at 1608, correcting distortion in the image data. As discussed above, images received at the image sensor may be in a radial form, e.g. ring-shaped. Distortion correction may allow for a radial image to be resized and converted to a rectangular image that may be interpreted more easily by viewers and downstream processing methods. Method 1600 further comprises, at 1610, outputting a depth image after correcting distortion in the image data.

As mentioned above, a 360-degree audiovisual communications system as disclosed herein may be configured to identify one or more person(s) in the surrounding environment via facial recognition using any suitable facial recognition methods, as shown at 1612 of FIG. 16. Additionally, user motions may be tracked from depth data, e.g., using skeletal tracking, and used as inputs to trigger the execution of responsive actions. Actions may include, but are not limited to, device control actions such as zooming in or out on a gesturing user, zooming portions of an image to follow a user around a room, muting or unmuting audio transmission and/or recording, turning image transmission and/or recording on or off, etc. As such, method 1600 may include, at 1614, determining movements of users via gesture recognition, and at 1616, executing actions in response to detected gestures.

Method 1600 also comprises, at 1618, receiving audio data from an audio sensor. As mentioned, a 360-degree audiovisual communications system may comprise an acoustic sensor configured to acquire audio data including sounds, music, speech, etc. Such audio data may be used to trigger the execution of actions. For example, method 1600 may comprise, at 1620, determining from the audio data that a person is currently speaking, and at 1622, automatically zooming the image acquisition system on the person who is currently speaking. Further, depth image information may be used in combination with acoustic information to perform noise reduction, e.g. by using beamforming techniques based upon a location of a person who is speaking.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 1700 schematically shows a non-limiting embodiment of a computing system 1700 that can enact one or more of the methods and processes described above. Computing system 1700 is shown in simplified form. Computing system 1700 may take the form of one or more personal computers, server computers, tablet computers, home-entertainment computers, network computing devices, gaming devices, mobile computing devices, mobile communication devices (e.g., smart phone), and/or other computing devices, such as computing device 324.

Computing system 1700 includes a logic subsystem 1702 and a storage subsystem 1704. Computing system 1700 may optionally include a display subsystem 1706, input subsystem 1708, communication subsystem 1710, and/or other components not shown in FIG. 17.

Logic subsystem 1702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1702 may include one or more processors configured to execute software instructions. Additionally or alternatively, the logic subsystem 1702 may include one or more hardware or firmware logic machines configured to execute hardware or firmware instructions. Processors of the logic subsystem 1702 may be single-core or multi-core, and the instructions executed thereon may be configured for sequential, parallel, and/or distributed processing. Individual components of the logic subsystem 1702 optionally may be distributed among two or more separate devices, which may be remotely located and/or configured for coordinated processing. Aspects of the logic subsystem 1702 may be virtualized and executed by remotely accessible, networked computing devices configured in a cloud-computing configuration.

Storage subsystem 1704 includes one or more physical devices configured to hold instructions executable by the logic subsystem 1702 to implement the methods and processes described herein. When such methods and processes are implemented, the state of storage subsystem 1704 may be transformed—e.g., to hold different data.

Storage subsystem 1704 may include removable and/or built-in devices. Storage subsystem 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1704 may include volatile, nonvolatile, dynamic, static, read/write, read-only, random-access, sequential-access, location-addressable, file-addressable, and/or content-addressable devices.

It will be appreciated that storage subsystem 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1702 and storage subsystem 1704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SoC), and complex programmable logic devices (CPLDs), for example.

The term "program" may be used to describe an aspect of computing system 1700 implemented to perform a particular function. In some cases, a program may be instantiated via logic subsystem 1702 executing instructions held by storage subsystem 1704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1706 may be used to present a visual representation of data held by storage subsystem 1704. This visual representation may take the form of a graphical user interface (GUI). As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic subsystem 1702 and/or storage subsystem 1704 in a shared enclosure, or such display devices may be peripheral display devices.

When included, input subsystem 1708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1710 may be configured to communicatively couple computing system 1700 with one or more other computing devices. Communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

Another example provides a depth imaging system comprising an image sensor, a reflector subsystem comprising one or more reflectors arranged to reflect a radial field of view of a surrounding environment toward the image sensor, a projector configured to project light onto the reflector subsystem for reflection into the surrounding environment, and a computing device comprising a logic subsystem and a storage subsystem comprising instructions executable by the logic subsystem to receive image data from the image sensor, and output a depth image. The reflector subsystem may additionally or alternatively include an ellipsoidal reflector and/or a spherical reflector. The reflector subsystem may additionally or alternatively include a flat reflector configured to reflect the radial field of view of the surrounding environment toward the ellipsoidal reflector. The reflector subsystem may additionally or alternatively include a first ellipsoidal reflector and a second ellipsoidal reflector, the first ellipsoidal reflector positioned closer to the image sensor relative to the second ellipsoidal reflector, and wherein the first ellipsoidal reflector and the second ellipsoidal reflector are arranged to reflect different perspectives of the surrounding environment toward the image sensor. In this example, a radius of the first ellipsoidal reflector may be smaller than a radius of the second ellipsoidal reflector, or a radius of the first ellipsoidal reflector may be larger than a radius of the second ellipsoidal reflector. The first ellipsoidal reflector may additionally or alternatively include an opening, and wherein the second ellipsoidal reflector is arranged to reflect an image of the surrounding environment through the opening of the first ellipsoidal reflector toward the image sensor. The first ellipsoidal reflector may additionally or alternatively include an infrared rejection coating. The depth imaging system may additionally or alternatively include one or more additional projectors arranged at different locations around the reflector subsystem. The depth imaging system may additionally or alternatively include one or more additional image sensors arranged at different locations around the reflector subsystem, each image sensor configured to receive at least a portion of the radial field of view. The depth imaging system may additionally or alternatively include one or more additional image sensors and one or more additional projectors arranged at different locations around the reflector subsystem. The radial field of view may additionally or alternatively include a 360-degree radial field of view of the surrounding environment. The instructions may be additionally or alternatively be executable to correct distortion in the image data. The depth imaging system may additionally or alternatively include an audio sensor, and wherein the instructions are further executable by the logic subsystem to receive audio data from the audio sensor, determine from the audio data that a person in the surrounding environment is currently speaking, and dynamically zoom the image sensor toward the person currently speaking. The instructions may be additionally or alternatively executable by the logic subsystem to identify one or more persons in the surrounding environment via facial recognition and determine one or more movements of the one or more persons via gesture recognition.

Another example provides, on a depth imaging system comprising a reflector subsystem, a projector, and a computing device, a method of imaging a 360-degree radial field of view of a surrounding environment, the method comprising, projecting light via the projector onto the reflector subsystem for reflection into the surrounding environment, receiving at the image sensor, via the reflector subsystem, light from the projector that is reflected by objects within the 360-degree radial field of view of the surrounding environment, receiving image data from the image sensor, and outputting a depth image. In this example, the depth imaging system may additionally or alternatively include an audio sensor, and the method may additionally or alternatively include identifying one or more persons in the surrounding environment via facial recognition, determining one or more movements of the one or more persons via gesture recognition, receiving audio data from the audio sensor, determining from the audio data that a person in the surrounding environment is currently speaking, and automatically zooming the image sensor toward the person currently speaking.

Another example provides an audiovisual communications system, comprising an image sensor configured to acquire depth image data, a reflector subsystem arranged to reflect a 360-degree radial field of view of a surrounding environment toward the image sensor, the reflector subsystem comprising a first ellipsoidal reflector and a second ellipsoidal reflector, the first ellipsoidal reflector positioned closer to the image sensor relative to the second ellipsoidal reflector, and the first ellipsoidal reflector and the second ellipsoidal reflector having different radii, a projector configured to project light onto the reflector subsystem for reflection into the surrounding environment, and a computing device comprising a logic subsystem and a storage subsystem comprising instructions executable by the logic subsystem to receive the depth image data from the image sensor, the depth image data comprising a first perspective of the surrounding environment as reflected by the first ellipsoidal reflector and a second perspective of the surrounding environment as reflected by the second reflector, correct distortion in the depth image data, and output a depth image after correcting distortion in the depth image data. The first ellipsoidal reflector may additionally or alternatively include an opening, and wherein the second ellipsoidal reflector is arranged to reflect an image of the 360-degree radial field of view of the surrounding environment through the opening of the first ellipsoidal reflector toward the image sensor.

The invention claimed is:

1. A depth imaging system, comprising:
an image sensor;
a reflector arranged to reflect a radial field of view of a surrounding environment toward the image sensor;
a projector configured to project light onto the reflector for reflection into the surrounding environment by the reflector; and
a computing device comprising a logic subsystem and a storage subsystem comprising instructions executable by the logic subsystem to
receive image data from the image sensor, and
output a depth image based upon the image data.

2. The system of claim 1, wherein the reflector comprises an ellipsoidal reflector.

3. The system of claim 2, wherein the ellipsoidal reflector comprises a spherical reflector.

4. The system of claim 1, further comprising a flat reflector configured to reflect the radial field of view of the surrounding environment toward the ellipsoidal reflector.

5. The system of claim 1, wherein the reflector comprises a first ellipsoidal reflector, and wherein the system further comprises a second ellipsoidal reflector, the first ellipsoidal reflector positioned closer to the image sensor relative to the second ellipsoidal reflector, and wherein the first ellipsoidal reflector and the second ellipsoidal reflector are arranged to reflect different perspectives of the surrounding environment toward the image sensor.

6. The system of claim 5, wherein a radius of the first ellipsoidal reflector is smaller than a radius of the second ellipsoidal reflector.

7. The system of claim 5, wherein a radius of the first ellipsoidal reflector is larger than a radius of the second ellipsoidal reflector.

8. The system of claim 5, wherein the first ellipsoidal reflector comprises an opening, and wherein the second ellipsoidal reflector is arranged to reflect an image of the surrounding environment through the opening of the first ellipsoidal reflector toward the image sensor.

9. The system of claim 8, wherein the first ellipsoidal reflector comprises an infrared rejection coating.

10. The system of claim 1, further comprising one or more additional projectors arranged at different locations around the reflector.

11. The system of claim 1, further comprising one or more additional image sensors arranged at different locations around the reflector, each image sensor configured to receive at least a portion of the radial field of view.

12. The system of claim 1, further comprising one or more additional image sensors and one or more additional projectors arranged at different locations around the reflector.

13. The system of claim 1, wherein the radial field of view comprises a 360-degree radial field of view of the surrounding environment.

14. The system of claim 1, wherein the instructions are further executable by the logic subsystem to correct distortion in the image data.

15. The system of claim 1, further comprising an audio sensor, and wherein the instructions are further executable by the logic subsystem to
receive audio data from the audio sensor,
determine from the audio data that a person in the surrounding environment is currently speaking, and
dynamically zoom the image sensor toward the person currently speaking.

16. The system of claim 1, where the instructions are further executable to identify one or more persons in the surrounding environment via facial recognition and determine one or more movements of the one or more persons via gesture recognition.

17. On a depth imaging system comprising a reflector, a projector, and a computing device, a method of imaging a 360-degree radial field of view of a surrounding environment, the method comprising:
projecting light via the projector onto the reflector for reflection into the surrounding environment by the reflector;
receiving at the image sensor, via the reflector, light from the projector that is reflected by objects within the 360-degree radial field of view of the surrounding environment;
receiving image data from the image sensor; and
outputting a depth image.

18. The method of claim 17, wherein the depth imaging system further comprises an audio sensor, and wherein the method further comprises
identifying one or more persons in the surrounding environment via facial recognition;
determining one or more movements of the one or more persons via gesture recognition;
receiving audio data from the audio sensor;
determining from the audio data that a person in the surrounding environment is currently speaking; and
automatically zooming the image sensor toward the person currently speaking.

19. An audiovisual communications system, comprising
an image sensor configured to acquire depth image data;
a reflector subsystem arranged to reflect a 360-degree radial field of view of a surrounding environment toward the image sensor, the reflector subsystem comprising a first ellipsoidal reflector and a second ellipsoidal reflector, the first ellipsoidal reflector positioned closer to the image sensor relative to the second ellipsoidal reflector, and the first ellipsoidal reflector and the second ellipsoidal reflector having different radii, the first ellipsoidal reflector configured to provide a first image on the image sensor, and the second ellipsoidal reflector configured to provide a second image on the image sensor, the first and second images providing different perspectives of the surrounding environment for stereo imaging;
a projector configured to project light onto the reflector subsystem for reflection into the surrounding environment; and
a computing device comprising a logic subsystem and a storage subsystem comprising instructions executable by the logic subsystem to
receive the depth image data from the image sensor, the depth image data comprising a first perspective of the surrounding environment as reflected by the first ellipsoidal reflector and a second perspective of the surrounding environment as reflected by the second reflector,
correct distortion in the depth image data, and
output a depth image after correcting distortion in the depth image data.

20. The system of claim 19, wherein the first ellipsoidal reflector comprises an opening, and wherein the second ellipsoidal reflector is arranged to reflect an image of the 360-degree radial field of view of the surrounding environment through the opening of the first ellipsoidal reflector toward the image sensor.

* * * * *